United States Patent
Chin et al.

(10) Patent No.: US 7,518,860 B2
(45) Date of Patent: Apr. 14, 2009

(54) COMBINED OUTFLOW PORTAL FOR ACOUSTIC AND THERMAL ENERGY

(75) Inventors: Vance Chin, San Francisco, CA (US); Richard Pocklington, San Francisco, CA (US); Jonathan Betts-LaCroix, San Mateo, CA (US)

(73) Assignee: OQO, Inc., San Francisco, CA (US)

( * ) Notice: Subject to any disclaimer, the term of this patent is extended or adjusted under 35 U.S.C. 154(b) by 129 days.

(21) Appl. No.: 11/580,213

(22) Filed: Oct. 12, 2006

(65) Prior Publication Data

US 2008/0087329 A1    Apr. 17, 2008

Related U.S. Application Data

(60) Provisional application No. 60/727,017, filed on Oct. 14, 2005.

(51) Int. Cl.
    *H05K 7/20*    (2006.01)
(52) U.S. Cl. .................. 361/687; 361/694; 361/695; 454/184
(58) Field of Classification Search .............. None
    See application file for complete search history.

(56) References Cited

U.S. PATENT DOCUMENTS

| | | | |
|---|---|---|---|
| 5,448,495 A * | 9/1995 | Liu | 361/683 |
| 5,533,132 A * | 7/1996 | Button | 381/332 |
| 5,828,768 A | 10/1998 | Eatwell et al. | |
| 7,230,825 B2 * | 6/2007 | Sawyer | 361/687 |
| 2005/0185376 A1 | 8/2005 | Sawyer | |
| 2006/0061964 A1 * | 3/2006 | Cheng | 361/687 |

\* cited by examiner

*Primary Examiner*—Gregory D Thompson
(74) *Attorney, Agent, or Firm*—Brian N. Young; Trellis IP Law Group, PC

(57) ABSTRACT

An apparatus is provided that provides a common opening for air flow and speaker outflow. The apparatus includes a compartment with an opening. The compartment has a top surface and a bottom surface and includes a fan and a speaker. The fan is positioned to rotate one or blades around an axis. The one or more blades spin in a direction substantially towards an opening during at least one point during the spinning. The fan directs the air flow towards the opening. The speaker is positioned such that its movement is along the axis.

23 Claims, 2 Drawing Sheets

COMBINED OUTFLOW PORTAL FOR ACOUSTIC AND THERMAL ENERGY

CROSS REFERENCES TO RELATED APPLICATIONS

BACKGROUND

Embodiments of the invention relate, in general, to computing, and more specifically, to a common opening for air flow and speaker outflow.

A typical portable computing device includes a processor that generates heat. Hence, a heat-dissipation mechanism such as a fan is required to transfer the heat generated away from the processor. To accommodate the fan, a relatively large chamber is required to ensure effective heat dissipation. As portable devices become smaller in size, the large chamber required hinders the potential reduction in size that is possible.

DETAILED DESCRIPTION OF EMBODIMENTS

Embodiments of the invention provide an apparatus that provides a common opening for air flow and speaker outflow. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatuses, systems, assemblies, methods, components, materials, parts, and/or so forth. In other instances, well-known structures, materials or operations are not specifically shown or described in detail to avoid obscuring aspects of embodiments of the present invention.

In accordance with an embodiment of the invention, a heat-dissipating element transfers heat from various heat sources to a compartment. The compartment includes a fan, which uses air to dissipate heat through an opening in the compartment. The compartment also includes a speaker that is used to emanate sound (e.g., audio waves). In accordance with an embodiment, the speaker is placed between the fan and the opening such that the rotation of the fan forces out hot air through the opening. Also, sound waves emanate through the same opening. This helps in combining the air space required for two separate functions into a single air space that enables miniaturization in the function of the two separate features.

Figure 1:
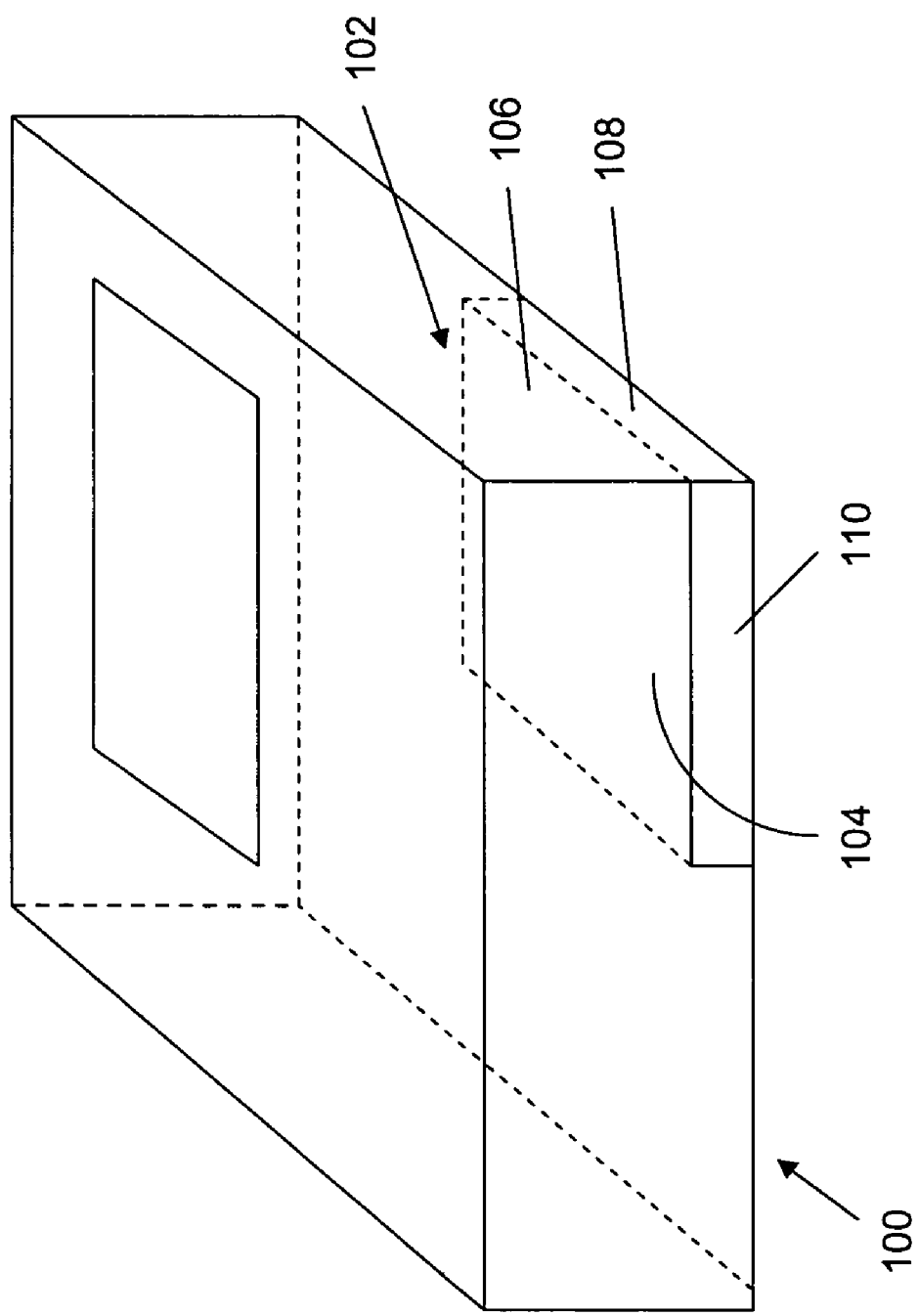
FIG. 1 illustrates a device that includes an apparatus providing a common opening for air flow and speaker outflow in accordance with an embodiment of the invention.

Referring now to the drawings by their reference numbers, FIG. 1 illustrates an example device 100 that includes compartment 104 providing a common opening for air flow and speaker outflow according to one embodiment of the present invention. In accordance with an embodiment of the invention, device 100 may be a portable device. For example, device 100 may include a hand-held computer, laptop computer, personal computer, personal digital assistant (PDA), cellular telephone, Blackberry device, pocket PC, movie camera, movie player, mobile computer etc. In accordance with other embodiments, device 100 is not limited to portable devices and may be used in any device, such as a laptop computer, television, DVD display player, etc.

In accordance with one embodiment, device 100 may be smaller than a laptop computer. For example, the dimensions of device 100 may substantially be 4.9 inches by 0.9 inches by 3.4 inches (Width (W)×Height (H)×Length (L). Variations of the dimension will be appreciated.

In accordance with one embodiment, apparatus 102 is a substantially rectangular or square chamber. However, other shapes and sizes will be appreciated. It may be located at one of the edges of device 100 such that an opening 110 is found on a side surface of device 100. However, multiple openings on the side surface of device 100 are also appreciated.

Compartment 104 has top surface 106 and bottom surface 108. Compartment 104 has opening 110, which is used as a common exit for air flow and speaker outflow. Opening 110 is on a side surface of compartment 104. In accordance with an embodiment of the invention, opening 110 can be on any of the edges or sides of compartment 104.

Figure 2:
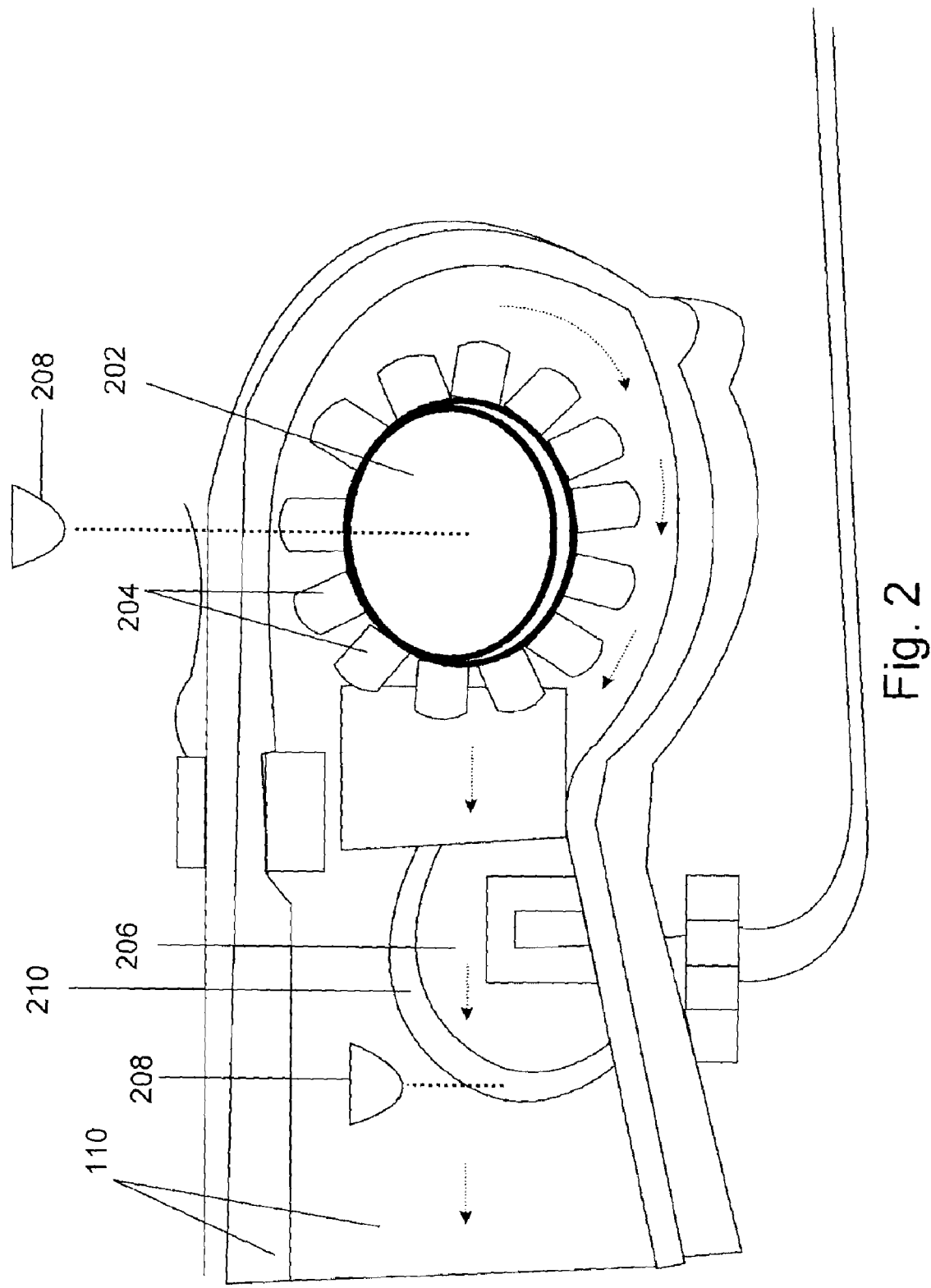
FIG. 2 illustrates a top view of the apparatus providing a common opening for air flow and speaker outflow in accordance with an embodiment of the invention.

FIG. 2 illustrates a top view of apparatus 102 that provides a common opening for air flow and speaker outflow, in accordance with an embodiment of the invention. Compartment 104 includes fan 202, blades 204 of fan 202, speaker 206, heat dissipating elements 208 and opening 110. The air flow within compartment 104 is also depicted. Rotation of blades 204 of fan 202 drives air flow over speaker 206 towards opening 110. The air carries the heat, dissipated by heat dissipating elements 208 into compartment 104, along with the sound waves generated by diaphragm of speaker 206 out of opening 110. Fan 202 is positioned to rotate one or blades around an axis. For example, the axis may be substantially located between top surface 106 and bottom surface 110. The one or more blades 204 spin in a direction substantially towards an opening 110. For example, the spinning is of the blades as they turn is towards opening 110. They may spin back around again. Thus, at one point during the spinning, blades 204 spin in a direction towards opening 110.

The inclusion of fan 202 and speaker 206 within the same compartment significantly reduces the size of compartment 104. Moreover, fan 202 and speaker 206 are arranged horizontally in compartment 104. This horizontal arrangement enables reduction in the height of compartment 104, which makes it narrow.

In accordance with an embodiment of the invention, compartment 104 radiates electromagnetic radiation through opening 110. Examples of electromagnetic radiation include, but are not limited to, light waves, infra-red radiation, radio waves, and x-rays.

Fan 202 is positioned such that its rotation is around an axis that is perpendicular to the top 106 and bottom surface 108 of compartment 104. The top surface 106 is found on the upper edge of opening 110 and the bottom surface 108 is a surface that is found on the lower edge of opening 110. The top and bottom surfaces may be perpendicular to the plane of opening 110. Fan 202 is placed horizontally so as to be parallel to the top and bottom surface of compartment 104. Consequently, fan 202 rotates along an axis perpendicular to the top and bottom surface of compartment 104. Moreover, diaphragm of speaker 206 is also placed horizontally alongside fan 202 such that the air flow from fan 202 blows out sound waves emanating from speaker 206 along with the heat dissipated from heat dissipating elements 208. Such an arrangement allows compartment 104 to be much narrower. The narrowing of the compartment may allow the device to be narrow in any direction. For example, the space taken up in the height, width, or length directions by compartment 104 may be reduced. Consequently, device 100 is also more compact. However, the diaphragm of speaker 206 can have multiple orientations with respect to fan 202 and compartment 104. For example, the diaphragm of speaker 206 may be perpendicular to fan 202.

In one embodiment, because fan 202 is placed such that its rotation is around an axis that is perpendicular to the top 106 and bottom surface 108, and not rotating around an axis in parallel to the top and bottom surfaces, the height of compartment 104 may be reduced significantly. If the fans diameter is placed around the axis in parallel with the top and bottom surfaces, then the height is at least the diameter of the fan. This may require that the height of compartment 104 be too large to allow the reduction in size of device 100. Accordingly, by placing the fan in such that its rotation is around an axis that is perpendicular to the top 106 and bottom surface 108, the height of device 100 may be reduced. This may be useful when devices 100 are small in height but longer in length.

Fan 202 includes blades 204, which rotate around the axis. The design of fan 202 is such that it directs the air flow towards opening 110. Additional devices such as heat dissipating elements 208 can also be placed near fan 202 and heat pipe 210 respectively. Heat dissipating elements 208 includes devices such as heat sinks, heat pipes, and radiators. Radiators may be filled with any kind of liquid that aids heat transfer.

In accordance with another embodiment of the invention, fan 104 blows air sideways through opening 110. For example, as fan 202 spins, blades 204 are configured such that air flows sideways through opening 110. In accordance with one embodiment, air flow is substantially sideways and not towards the top or bottom surface of compartment 104. In accordance with another embodiment of the invention, fan 104 may be placed at different locations within compartment 102.

Speaker 206 is positioned such that the movement of the diaphragm is along the axis, perpendicular to the top and bottom surface of compartment 104. Diaphragm is used for generating sound waves by vibration. Speaker 206 is positioned such that it is substantially out of the stream of the air flow and moves up or down along the axis. As shown, most of compartment 104 is open between fan 202 and opening 110. This allows air to freely flow between fan 202 and opening 110. Other positions of speaker 206 may be appreciated. The positioning of speaker 206 also allows the reduction in size of compartment 104. For example, the height is reduced by placing speaker 206 perpendicular to the top and bottom surface of compartment 104.

In accordance with an embodiment of the invention, speaker 206 is placed between fan 202 and opening 110. Compartment 104 may be used as a resonance chamber for speaker 206. Air flows into, as well as out of, compartment 104. Consequently, the space behind fan 202 or near fan 202 or beside fan 202 may be used as a resonance chamber. Use of compartment 104 for other purposes will be appreciated. Speaker 206 has a corresponding driver attached to it. The driver provides signals to speaker 206 that are used to provide sound waves as is known in the art.

In accordance with an embodiment of the invention, speaker 206 is placed in a chamber that acts as a speaker enclosure. The driver of speaker 206 is placed adjacent to the speaker enclosure. Speaker 206 can be of various types depending on the functional requirements of device 100. For example, speaker 206 may be a simplified stereo system or a sound system with multiple stereo speakers.

In accordance with another embodiment of the invention, apparatus 102 can have different fan-speaker arrangements. Moreover, speaker 206 could be placed in the wall of compartment 104. Additionally, speaker 206 can itself act as the wall of compartment 104.

The diameter of fan 202 and speaker 206 is a function of the amount of heat to be dissipated and the height of opening 110. The diameter of diaphragm of speaker 206 would be larger if functional requirements require increased sound levels. Moreover, a more efficient heat-dissipating mechanism would be required, if the amount of heat to be dissipated out of device 100 is larger. Consequently, fan 202 would need a larger diameter with larger number of blades to cope with the increased diameter of diaphragm of speaker 206 and the increased amount of heat to be dissipated.

Heat-dissipating element 208 transfers heat from various heat sources to compartment 104. Heat-dissipating element 208 may be one or more of a heat sink and a heater wire. Heat-dissipating element 208 is located near fan 202, which dissipates the heat from compartment 104 through opening 110. Fan 202 blows air, which becomes hot after consuming the heat from heat-dissipating element 208. Subsequently, the hot air flows over speaker 206, carrying the sound waves emanated, and moves out through opening.

Opening 110 can have various sizes and shapes depending on the functional requirements of device 100. However, opening 110 should be such that it provides suitable vent for hot air as well as speaker outflow.

In accordance with another embodiment of the invention, a minimum distance is maintained between speaker 206 and opening 110 to ensure optimum functioning of compartment 104.

In accordance with another embodiment of the invention, device 100 may have air-intake vents to provide air for cooling any components that may generate unnecessary heat. The air-intake vents may be positioned at any suitable location in device 100. The position of the air-intake vents depends on the position of fan 202, heat-dissipating element 208, and opening 110. Moreover, the size and shape of the air-intake vents can be suitably chosen as per functional requirements of device 100. In addition, the air-intake vents can be designed to modify or amplify the acoustic properties of speaker 206.

According to embodiments of the invention, apparatus, which provides a common opening for air flow and speaker outflow, is provided. The apparatus includes compartment with opening, wherein compartment includes a top surface and a bottom surface. The apparatus also comprises a fan that is included in the compartment, wherein the fan is positioned such that it rotates around an axis that is perpendicular to the top and bottom surfaces of the compartment, and the air flow is directed towards the opening by the fan. Further, a speaker is included in the compartment, positioned such that the movement of the speaker is along the axis.

According to embodiments of the invention, an apparatus, which provides a common opening for air flow and speaker outflow in a portable computing device, is provided. The apparatus includes a compartment with an opening, wherein the compartment includes a top and a bottom surface. A fan is included in the compartment. The fan is positioned such that its rotation is around an axis that is perpendicular to the top and bottom surfaces of the compartment, wherein the air flow is directed towards the opening by the fan. Heat dissipating elements that are located near the fan and near the heat pipe in the compartment dissipates heat from the processor of the portable computing device into the compartment. A speaker is included in the wall or along the wall of the compartment.

The compartment, wherein the speaker is positioned, acts as a resonance chamber for the speaker and as outflow part from the fan.

Various embodiments of the invention provide an apparatus with a common opening for air flow and speaker outflow that finds use in various portable computing devices. Further, the invention provides the compartment to be dynamically adjusted by changing the arrangement of the fan. Instead of, or as well as, the sound waves, the compartment may act as an area out of which electromagnetic radiation emanates. Furthermore, the invention facilitates placing of additional devices around the fan, especially those modifying heat dissipation and sound wave emanation properties. In addition, the invention provides the fan to efficiently throw the hot air through the opening of the compartment. The invention also provides different fan-speaker arrangements. Although the invention has been discussed with respect to specific embodiments thereof, these embodiments are merely illustrative, and not restrictive, of the invention.

Although the description has been described with respect to particular embodiments thereof, these particular embodiments are merely illustrative, and not restrictive. Although a service processor is described, it will be understood that other processors may be used.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

What is claimed is:

1. An apparatus comprising:
   a compartment within a portable computing device, the compartment including a side surface, a top surface, and a bottom surface, wherein an opening is included on the side surface;
   a fan found in the compartment positioned to rotate one or more blades around an axis substantially perpendicular to the top surface and the bottom surface of the compartment and substantially parallel opening on the side surface, wherein the one or more blades spin in a direction substantially towards the opening during at least one point during the spinning; and a speaker included in the compartment configured to generate sound waves, wherein the compartment has a shape that facilitates air flow out of the portable computing device away from the fan where both hot air and sound waves flow out of the opening of the compartment in the portable computing device.

2. The apparatus of claim 1 further comprising a heat dissipating element configured to direct heat towards the fan, wherein the fan dissipates the heat through the opening.

3. The apparatus of claim 2, wherein the heat dissipating element, dissipating heat into the compartment, is located near the fan.

4. The apparatus of claim 2, wherein the compartment allows hot air to flow away from the heat dissipating element.

5. The apparatus of claim 1, wherein the opening is on a side surface of the compartment.

6. The apparatus of claim 1, wherein the compartment is used as a resonance chamber for the speaker.

7. The apparatus of claim 6, wherein a resonance path is extended through the fan into the compartment for lower frequency response.

8. The apparatus of claim 1, wherein the speaker is positioned between the fan and the opening.

9. The apparatus of claim 1, wherein the one or more blades rotating around the axis perpendicular to the top surface and the bottom surface of the device such that a blade in the one or more blades rotates towards the opening and then away from the opening.

10. The apparatus of claim 9, wherein the rotation of the one or more blades directs air flow towards the opening of the compartment.

11. The apparatus of claim 1, wherein the speaker moves up or down between the top surface and the bottom surface of the device.

12. The apparatus of claim 1, wherein the speaker is positioned out of the air flow.

13. The apparatus of claim 1, wherein the speaker is included as a part of the wall of the compartment.

14. The apparatus of claim 1, wherein the portable device has substantially a length of 4 inches, a width of 3 inches, and a height of ¾ inches.

15. A portable device comprising:

a compartment including a side surface, a top surface, and a bottom surface, the compartment including an opening included on the side surface;

a fan found in the compartment positioned to rotate one or more blades around an axis substantially perpendicular to the top surface and the bottom surface of the compartment and substantially parallel to the opening on the side surface, wherein the one or more blades spin in a direction substantially towards the opening during at least one point during the spinning; and a speaker included in the compartment configured to generate sound waves, wherein the compartment has a shape that facilitates air flow out of the portable device away from the fan where both hot air and sound waves flow out of the opening of the compartment in the portable device.

16. The portable device of claim 15, wherein the portable device comprises a hand-held computer, laptop computer, personal computer, personal digital assistant (PDA), cellular telephone, movie camera, movie player, mobile computer, and/or pocket PC.

17. The portable device of claim 15, wherein the portable device has substantially of length 4 inches, width 3 inches, and height ¾ inches.

18. The portable device of claim 15, wherein the axis of rotation of the fan is substantially perpendicular to a top and a bottom surface of the compartment such that a blade in the one or more blades rotates towards the opening and then away from the opening.

19. The portable device of claim 15, wherein the diaphragm of speaker vibrates in a direction perpendicular to the top and the bottom surface of the compartment.

20. The portable device of claim 15, wherein the air flows over the diaphragm of the speaker out through the opening.

21. The portable device of claim 15, further comprising a heat dissipating element, the heat dissipating element for dissipating the heat from the portable device into the compartment.

22. The portable device of claim 15, wherein the heat dissipating element dissipates heat from a processor.

23. The portable device of claim 20, wherein the heat dissipating element in the compartment is at least one of heat pipe, heat sink, and radiator.

* * * * *